UNITED STATES PATENT OFFICE.

HAROLD S. ASHENHURST, OF CHICAGO, ILLINOIS, ASSIGNOR TO HERBERT A. PARKYN, OF CHICAGO, ILLINOIS.

INSULATING SUBSTANCE.

1,402,133.   Specification of Letters Patent.   Patented Jan. 3, 1922.

No Drawing.   Application filed May 20, 1920. Serial No. 382,903.

*To all whom it may concern:*

Be it known that I, HAROLD S. ASHENHURST, a citizen of the United States, and resident of Chicago, in the county of Cook and State of Illinois, have invented certain new and useful Improvements in an Insulating Substance, of which the following is a specification.

My invention relates to heat insulating materials and particularly to a novel improvement in the composition of matter described in my prior Patent No. 1,230,085, of June 12, 1917.

In that patent I disclosed a composition of matter the major constituent of which was asbestos in comminuted form and suggested the possibility of employing other refractory materials including calcium sulphate or gypsum. However, long experiments failed to demonstrate any practical value in this suggestion inasmuch as an insulating material of sufficent lightness could not be produced by employing calcium sulphate as disclosed in that patent. While the reactions were prompt and vigorous and the material became exceedingly porous in character, it would not remain in that condition but immediately "fell." In other words, while the mass seemed to "rise" in a most satisfactory manner and gave promise of the production of a solid body of extreme lightness, it invariably "fell" and in its final form was much too heavy to be of practical use.

I have discovered a means of obviating this tendency and am able to produce an insulating material of extreme lightness; that is, one in which the cellular structure is most pronounced and which is stable in form. The result is secured by adding a small quantity of a so-called "retarder" to the gypsum and then employing the gypsum as the principal constituent to which is added chemicals similar to those proposed in my prior patent heretofore referred to. The retarder has the effect of slowing up the process of hydraulic setting of the calcium sulphate and the desired result is secured for the reason that the substance does not set before the evolution of gas and the enlargement of the mass is complete. Apparently the reason why the mass invariably fell was that the calcium sulphate began to hydraulically set before the expansion of the mass was complete and thus the cells were broken. By employing a retarder this objection is obviated and I am able to produce a substance as light as 12 pounds per cubic foot having a specific gravity as low as 0.19. This, as will readily be understood, is of enormous advantage not only because of the relatively high insulating capacity but because of the economy in the use of gypsum as the major constituent.

Preferably also I mix with the materials a small quantity of fibrous material such as long fiber asbestos, or in the event the material is to be used where high heat is not to be resisted, cocoa or similar organic fibers. These fibers serve as reinforcements and strengthen the body of the material without adding to the weight thereof.

In practice a satisfactory result may be secured by combining approximately 4 pounds of a suitable retarder with each ton of gypsum. This is a commercial product and is so furnished when desired by the concerns which market the material. In making up the compound herein described I prefer to employ approximately 20 parts by volume of the so-described gypsum, 2 parts by volume of magnesium carbonate and 2 parts by volume of aluminum sulphate. Where a reinforcing element is to be employed I may add long fiber asbestos or cocoa fiber in the proportion of approximately 5% by weight of the mass. This compound in its dry state is inert. However, when it is to be utilized a quantity of water is added thereto sufficient to make a thick paste whereupon the leavening action begins and the mass expands or "rises," the final volume being many times that of the mixture as formed. While stability of form is secured within a short time, the final hardening is not complete for 24 hours. This bears out the theory that the action of the retarder is to thus restrain the hydraulic setting until such time as the liberation of gas is complete and, therefore, that there is no tendency toward breaking down of the structure.

Obviously the exact proportions specified are not essential and neither is it necessary to employ all of the chemicals specified in order to secure a desirable result.

I claim:

1. A new composition of matter composed of gypsum containing a retarding chemical, aluminum sulphate, magnesium carbonate and water.

2. A new composition of matter composed of gypsum as the major ingredient, a retarder, and a plurality of substances which when combined with water evolve a gas and produce a cellular structure.

3. A new composition of matter composed of calcium sulphate as the major constituent, a retarder to hydraulic setting thereof, and a plurality of substances adapted when combined with water to evolve carbon dioxide and thus form a multitude of cells throughout the mass.

4. A new composition of matter composed of gypsum as the major ingredient, a retarder, a plurality of substances which when combined with water evolve a gas and produce a cellular structure, and a fibrous binder.

5. A new composition of matter composed of gypsum as the major ingredient, a retarder, a plurality of substances which when combined with water evolve a gas and produce a cellular structure, and an inert fibrous substance adapted to act as a reinforcement to the cellular structure.

6. A new composition of matter composed of gypsum as the major ingredient, a retarder, a plurality of substances which when combined with water evolve a gas and produce a cellular structure, and approximately 5% by weight of fiber asbestos.

Signed at Chicago, Illinois, this 15th day of May, 1920.

HAROLD S. ASHENHURST.